United States Patent
Taraboulos et al.

[19]

[11] Patent Number: 5,910,380
[45] Date of Patent: Jun. 8, 1999

[54] CONTACT RETENTION SYSTEM

[75] Inventors: Mark Taraboulos, Chamblee; William Phelps III, Lawrenceville, both of Ga.; Fauzi Yahaya, Gelugor, Malaysia

[73] Assignee: Motorola, Inc., Schaumburg, Ill.

[21] Appl. No.: 09/049,733

[22] Filed: Mar. 27, 1998

[51] Int. Cl.$^6$ ................................................ H01M 002/10
[52] U.S. Cl. .............................. 429/100; 429/96; 429/97
[58] Field of Search .................................. 429/97, 99, 96, 429/100

[56] References Cited

U.S. PATENT DOCUMENTS

| | | | |
|---|---|---|---|
| 1,077,539 | 11/1913 | Mahla | 429/97 |
| 4,371,594 | 2/1983 | Ohara et al. | 429/97 |
| 5,122,927 | 6/1992 | Satou | 429/99 X |

*Primary Examiner*—John S. Maples
*Attorney, Agent, or Firm*—Felipe J. Farley

[57] ABSTRACT

A contact retention system for a housing for a battery cell is described which comprises a springy L-shaped retention member, a battery housing with a wall and a floor, with a catchment on both the wall and the floor, and contacts disposed between the base of the L-shaped retention member and the floor of the housing. The vertex of the L-shaped retention member is pushed toward the corner of the wall and the floor of the housing, and the ends of the L are restrained by the catchments. Any force exerted on the upper portion of the L-shaped retention member, pushing the upper portion toward the wall, causes the base of the L-shaped retention member to push the contacts toward the floor of the housing. The battery cells themselves provide the force on the upper portion of the L-shaped retention member. The contact system provides low-cost, easily manufacturable way to secure push-in contacts to a battery housing.

7 Claims, 4 Drawing Sheets

CONTACT RETENTION SYSTEM

TECHNICAL FIELD

This invention relates in general to the field of battery packs, and most particularly in the field of contacts for battery packs.

BACKGROUND

Nearly forty million Americans now use a cellular telephone, and another seven million or so are expected to subscribe this year. Sales of cellular telephones have risen faster than those of fax machines, subscriptions to cable television, and sales of video cassette recorders. As the cellular telephone has become more of a fixture in the American business and recreational landscape, consumers have come to expect and demand, greater liability from their cellular telephone. A critical aspect of the reliability of a cellular telephone is the reliability of its energy source, the battery pack. The battery pack must be able to withstand the physical stresses of ordinary use, which includes being able to withstand falls from a low height onto a hard surface. Therefore, in the cellular telephone industry, there is a constant search for battery housings of ever greater durability. Therefore, there is a need for a more durable battery housing.

DETAILED DESCRIPTION OF THE PREFERRED EMBODIMENT

Figure 1:
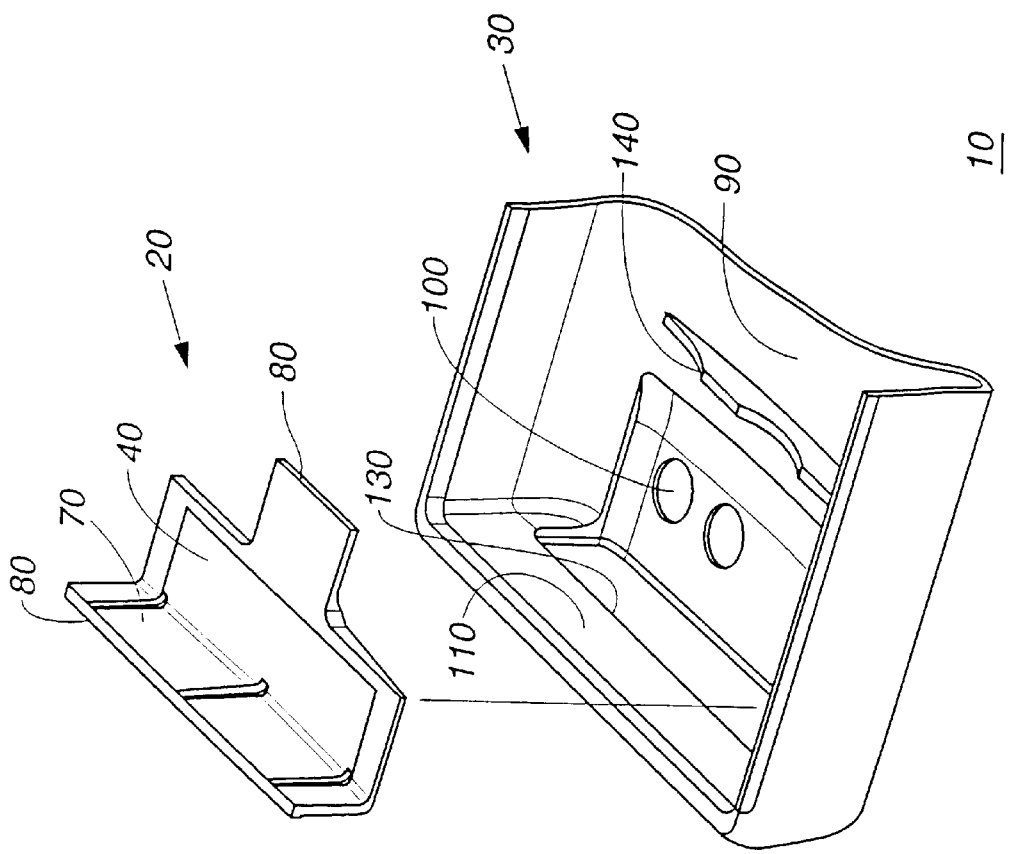
FIG. 1 is a perspective view of the contact retention system of the present invention, with a cut-away view of the battery housing.

The present invention is a contact retention system for housing for one or more battery cells. The system comprises a springy L-shaped retention member, a battery housing with a wall and a floor, with a catchment on both the wall and the floor, and contacts between the base of the L-shaped retention member and the floor of the housing. The vertex of the L-shaped retention member is pushed toward the corner formed by the wall and the floor of the housing, so that the ends of the capital L are restrained by the catchments. Since the capital L-shaped retention member normally has an interior angle greater than 90 degrees, the force exerted on the upper portion of the L-shaped retention member, pushing the upper portion toward the wall, causes the base of the L-shaped retention member to push the contact toward the floor of the housing. This downward force in the prior art would normally be exerted by the cells themselves. The invention therefore provides a very simple way to push the contacts through the apertures in the floor of the housing, and keep a constant force on those contacts.

In one embodiment of the invention, the interior angle of the L-shaped retention member is somewhat greater than the interior angle formed by the wall of the housing and the floor of the housing. Therefore, when pressure is exerted on the upper portion of the L-shaped retention member, pushing it toward the wall of the housing, the base of the L-shaped retention member pushes downward on any contact beneath it, pushing the contact toward the floor of the housing.

Proper retention of contacts is a difficult problem in the design of battery housing. Contacts can be insert molded into the plastic of a housing, but this is expensive. A less-expensive process is to place push-in contacts through the apertures in the floor of a housing, place the cells on top of the contacts, place the top of the housing on top of the cells, then weld the top cover of the housing to the rest of the housing. However, this method uses the pressure from the top of the housing, passed through the cells, to keep the contacts pushed through the floor of the housing. In order for the pressure to exist, pressure must be placed on the top cover of the housing as it is being secured to the bottom portion of the housing, typically by ultrasonic welding. This can result in a weak weld that can fail in normal use of the battery pack. In addition, in order for the weld to even take properly, very small tolerances must be designed into the plastic parts. This adds to the expense of production, and adds to the portion of unacceptable parts. The present invention provides a simple method of using push-in contacts in a battery housing, and keeping those contacts pressed tightly against the floor of a battery housing. The invention is easy to assemble, reducing the cost of manufacturing. Enough pressure can also be generated on the contacts to make a water-tight seal between the contacts and the floor of the battery housing. Furthermore, since the L-shaped retention member is elastic, pressure on the contacts is partially developed from this member, and not from the welding points attaching the top cover of the housing to the main body of the housing. Therefore, the ultrasonic weld can be strong.

FIG. 1. shows a perspective view of the contact retention system (10) of the present invention. FIG. 1 shows one embodiment of the L-shaped retention member (20) and the battery pack housing (30) into which it fits.

Figure 2:
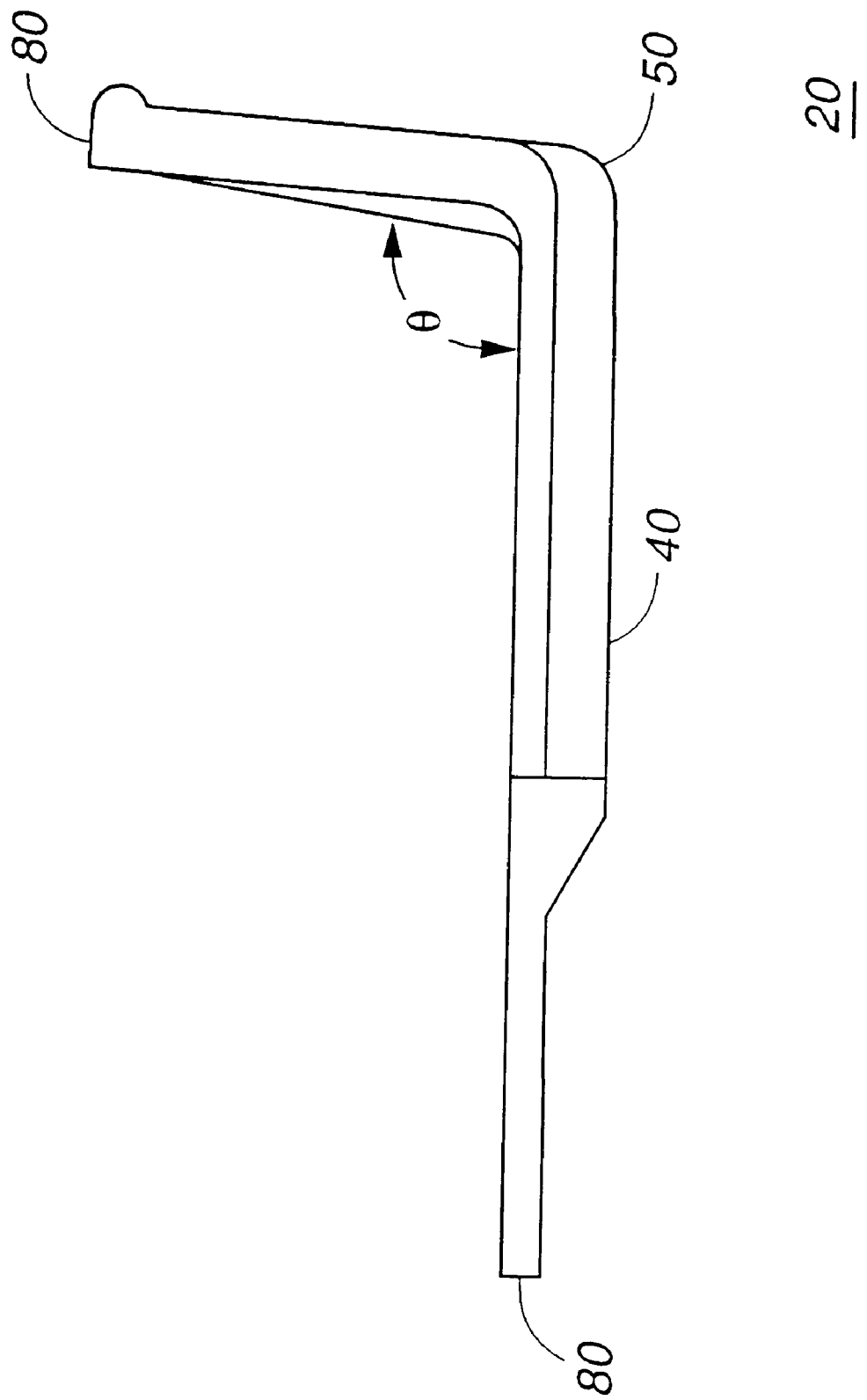
FIG. 2 is a side view of the L-shaped contact retention member of the present invention.

FIG. 2 shows a side view of one embodiment of the L-shaped retention member (20). In one embodiment of the invention, the L-shaped retention member (20) has an interior angle (60) which is greater than 90 degrees. The L-shaped retention member, of course, has two ends (80), an upper portion (70) and a base (40). It also has a vertex (50). Of course, the vertex (50) could be rounded as could the upper (70) portion and the base (40) of the L-shaped retention member.

Figure 3:
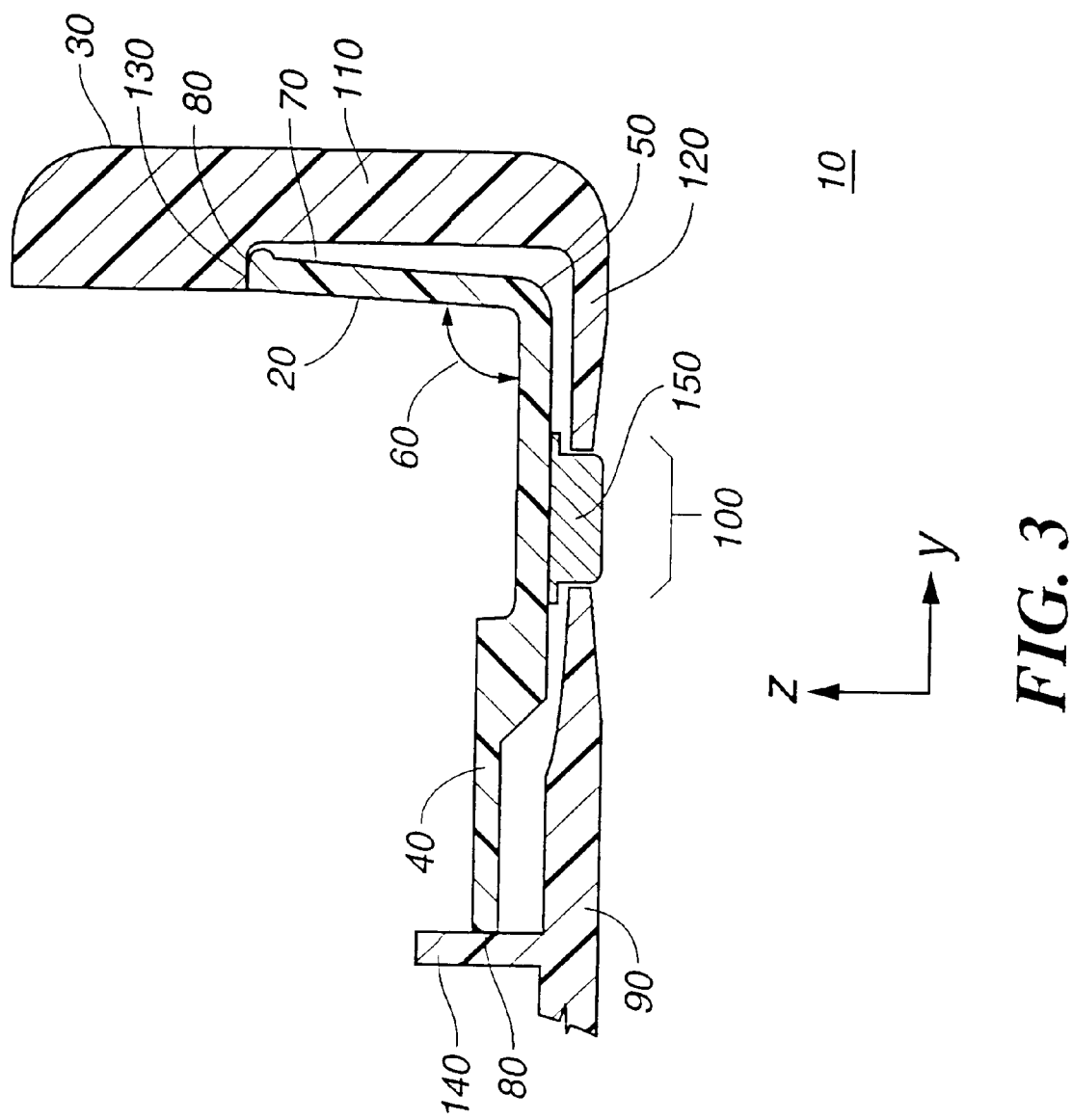
FIG. 3 is a side cut-away view of the L-shaped contact retention member of the present invention seated in a battery housing.

FIG. 3 shows a side cut-away view of the contact retention system of the present invention. The L-shaped retention member (20) is seated in the battery pack housing (30). The housing (30) has at least one wall (110) and a floor (90), joined at corner (120). The wall (110) of the battery housing has a catchment (130) which may be a ridge or a bump, and the floor (90) of the battery housing (30), also has a catchment (140) which may be a bump or a ridge. A push-in contact (150) is disposed in an aperture (100) in the floor of the battery housing underneath, the L-shaped retention member (20). The L-shaped retention member (20) is made of a springy material such as plastic, rubber, or metal. Therefore, when the vertex (50) of the L-shaped retention member is pushed toward the corner (120) of the battery housing formed by the wall (110) and floor (90), the ends (80) of the L-shaped retention member (20) are retained by catchments (130) and (140).

Figure 4:
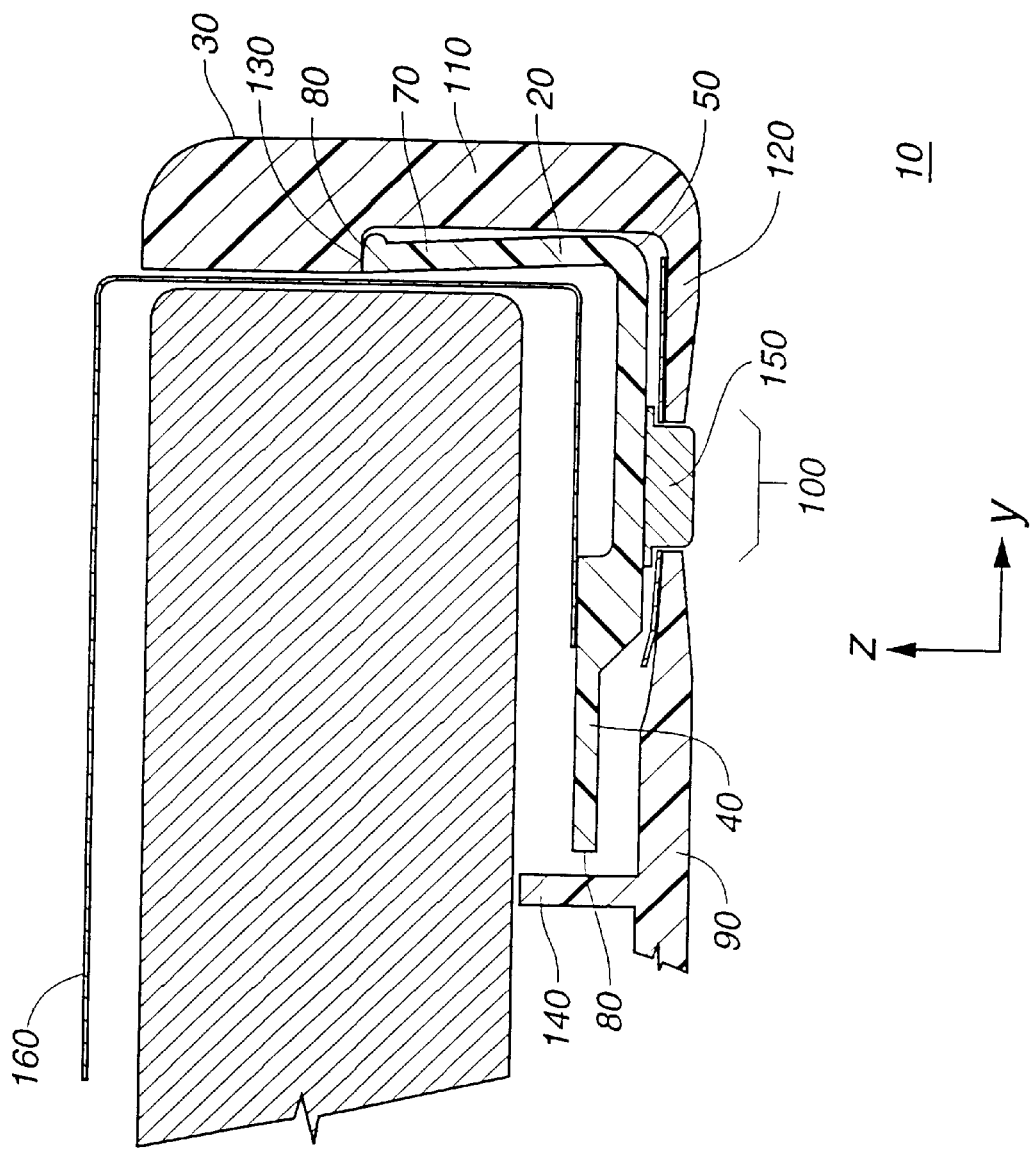
FIG. 4 is a side cut-away view of the L-shaped retention member seated in a battery housing, showing how cell packs are placed within the contact retention system.

FIG. 4 shows the contact retention system (10) in a side cut-away view, including battery cells (160). When cells (160) are placed in housing (30), they exert a pressure in the Y direction on the upper portion (70) of the L-shaped retention member. This force in the Y direction pushes the upper portion (70) of the L-shaped retention member towards wall (110) of the battery housing. This forces the base (40) of the L-shaped retention member downward along the Z axis, pushing contact (150) through aperture (100) in the floor of the battery housing. Therefore, force along the Y axis results in force along the Z axis, giving constant downward force on the contact (150). This keeps contact (150) from being pushed back into the housing (30) by pressure from, say, a charger contact (not shown).

The contact system (10) of the present invention is thus easy to assemble, does not need exacting tolerances, and exerts a constant downward force on the contacts.

In one embodiment of the invention, the L-shaped retention member does not necessarily have an interior angle greater than 90 degrees. Instead the interior angle of the L-shaped retention member is greater than the interior angle formed by the wall of the housing and floor of the housing. Therefore, when pressure is placed on the upper portion of the L-shaped retention member pushing it toward the wall of the housing, this forces the base of the L-shaped retention member downward toward the floor of the housing. The base of the L-shaped retention member thus pushes down on the contacts disposed under the base of the L-shaped retention member.

The contact (150) may also include a gasket (not shown) which forms a seal around the aperture (100) when the gasket is pressed downward.

The present invention may be used with any type of electrical device needing a way to secure push-in contacts for battery cells. The present invention may be further understood with reference to the following example.

EXAMPLE

A contact retention system was constructed in accordance with the present invention. A housing for a cellular telephone battery pack was made out of polycarbonate, and the L-shaped retention member was also made out of polycarbonate. The L-shaped retention member was constructed of plastic about 0.9 mm thick, and the top portion of the "L" was 8 mm high the base of the "L" was 7 mm long. In this case, a further shelf protruded from the base of the "L," in a rectangular section about 12 mm by 8 mm. The housing measured 22 mm by 55 mm by 120 mm. Four apertures in the floor of the housing had a diameter each of about 5 mm, to accept push-in contacts. The L-shaped retention member snapped in to the housing above the push-in contacts, and secured the contacts to the floor of the housing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A contact retention system for battery cells comprising:
    a. a springy L-shaped retention member with two ends, which L-shaped retention member has a base, an upper portion, and a vertex formed from the intersection of the base and the upper portion;
    b. a battery housing with a wall and a floor, which wall and floor intersect to form a corner, with a catchment on both the wall and the floor; and
    c. one or more contacts between the base of the L-shaped retention member and the floor of the housing;
where the vertex of the L-shaped retention member is pushed toward the corner formed by the wall and the floor of the housing so that the ends of the L-shaped retention member are restrained by the catchments, so that any force exerted on the upper portion of the L-shaped retention member, pushing the upper portion of the L-shaped retention member towards the wall of the battery housing, causes the base of the L-shaped retention member to push the contacts toward the floor of the battery housing.

2. The contact retention system of claim 1, wherein the springy L-shaped retention member has an interior angle greater than 90 degrees.

3. The contact retention system of claim 1, wherein the springy L-shaped retention member is made of material selected from the group consisting of plastic, rubber and metal.

4. An electronic device comprising the contact retention system of claim 1, where the electronic device is selected from the group consisting of computers, radios, and telephones.

5. The electronic device of claim 4, wherein the telephone is a cellular telephone.

6. The contact retention system of claim 1, wherein the vertex of the L-shaped retention member is rounded.

7. The contact retention system of claim 6, where the upper portion or the base of the L-shaped retention member is rounded.

* * * * *